United States Patent [19]

Leblans et al.

[11] Patent Number: 5,629,125
[45] Date of Patent: May 13, 1997

[54] PHOTOSTIMULABLE PHOSPHOR AND RADIATION IMAGE RECORDING AND REPRODUCING METHOD

[75] Inventors: Paul Leblans, Kontich; Albert D. Adriaensens, Mortsel, both of Belgium; Melvin Tecotzky, Mendham, N.J.

[73] Assignee: Agfa-Gevaert, N.V., Mortsel, Belgium

[21] Appl. No.: 438,308

[22] Filed: May 10, 1995

Related U.S. Application Data

[63] Continuation-in-part of Ser. No. 243,094, May 16, 1994, abandoned, which is a continuation of Ser. No. 940,985, Sep. 4, 1992, abandoned.

[30] Foreign Application Priority Data

Sep. 17, 1991 [EP] European Pat. Off. ............. 91202378

[51] Int. Cl.$^6$ .................. G03C 5/17; C09K 11/08
[52] U.S. Cl. .................. 430/139; 430/945; 430/21; 252/301.4 R; 252/301.4 H
[58] Field of Search .................. 430/139, 945, 430/21; 252/301.4 R, 301.4 H; 250/483.1, 484.4; 428/691

[56] References Cited

U.S. PATENT DOCUMENTS

| | | | |
|---|---|---|---|
| 3,859,527 | 1/1975 | Luckey | 250/327 |
| 4,239,968 | 12/1980 | Kotera et al. | 250/327.1 |
| 4,512,911 | 4/1985 | Kotera et al. | 252/301.4 H |
| 4,948,696 | 8/1990 | Nakamura et al. | 430/139 |
| 4,978,472 | 12/1990 | Kotera et al. | 252/301.4 H |

*Primary Examiner*—John A. McPherson
*Attorney, Agent, or Firm*—Breiner & Breiner

[57] ABSTRACT

A photostimulable phosphor, wherein said phosphor is within the scope of the following empirical formula (A):

$$Ba_{1-x-y-p-z}Sr_xM_y^{II}Cs_{2p}F_{2-a-b}Br_aX_b:zEu$$

wherein:

X is at least one halogen selected from the group consisting of Cl and I, $M^{II}$ is at least one alkaline earth metal selected from the group consisting of Ca and Mg;

x is in the range $0.10 \leq x \leq 0.55$;

a is in the range $0.70 \leq a \leq 0.96$;

y is in the range $0 \leq y \leq 0.10$;

b is in the range $0 \leq b < 0.15$;

p is in the range $10^{-4} \leq p \leq 10^{-1}$; and z is in the range $10^{-6} \leq z \leq 10^{-2}$.

18 Claims, 4 Drawing Sheets

PHOTOSTIMULABLE PHOSPHOR AND RADIATION IMAGE RECORDING AND REPRODUCING METHOD

This application is a continuation-in-part application of continuation of application Ser. No. 08/243,094 filed May 16, 1994, now abandoned, which in turn is a continuation of application Ser. No. 07/940,985 filed Sep. 4, 1992, now abandoned.

DESCRIPTION

1. Field of the Invention

The present invention relates to a storage phosphor which emits fluorescent light on photostimulation after being exposed to penetrating radiation.

2. Background of the Invention

In radiography the interior of objects is reproduced by means of penetrating radiation, which is high energy radiation also known as ionizing radiation belonging to the class of X-rays, gamma-rays and high-energy elementary particle radiation, e.g. beta-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals.

The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube. A survey of lasers useful in the read-out of photostimulable latent fluorescent images is given in the periodical Research Disclosure December 1989, item 308117.

Of special interest in the application of said image recording and reproducing method are particular barium fluorohalide phosphors identified in U.S. Pat. No. 4,239,968. The light output of these phosphors upon stimulation with helium-neon laser beam (633 nm) is compared with the stimulated light output of SrS:0.0001Eu,0.0001Sm photostimulable phosphor described in U.S. Pat. No. 3,859,527, the basic patent in the field of radiography operating with photostimulation of storage phosphors.

According to U.S. Pat. No. 4,239,968 a method is claimed for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, characterized in that said phosphor is at least one phosphor selected from the group of alkaline earth metal fluorohalide phosphors represented by the formula:

$$(Ba_{1-x}M_x^{II})FX:yA$$

wherein:

$M^{II}$ is one or more of Mg, Ca, Sr, Zn and Cd;

X is one or more of Br, Cl or I;

A is at least one member of the group consisting of Eu, Tb, Ce, Tm, Dy, Pr, Ho, Nd, Yb and Er; and x is in the range $0 \leq x \leq 0.6$ and y is in the range $0 \leq y \leq 0.2$, and that the wavelength of said stimulating rays is not less than 500 nm.

In FIG. 3 of said U.S. patent a graph shows the relationship between the wavelength of the stimulation rays and the luminance of the stimulated light, i.e. the stimulation spectrum wherefrom can be learned that said kind of phosphor has high photostimulation sensitivity to stimulation light of a He—Ne laser beam (633 nm) but poor photostimulability below 500 nm. The stimulated light (fluorescent light) is situated in the wavelength range of 350 to 450 nm with a peak at about 390 nm (ref. the periodical Radiology, September 1983, p. 834.).

It can be learned from said U.S. Pat. No. 4,239,968 that it is desirable to use a visible ray-stimulable phosphor rather than an infra-red ray-stimulable phosphor because the traps of an infra-red-stimulable phosphor are shallower than these of the visible ray-stimulable phosphor and accordingly the radiation image storage panel comprising the infra-red ray-stimulable phosphor exhibits a relatively rapid dark-decay (fading). Taking into account image fading read-out has to proceed relatively soon after the image-wise exposure to penetrating radiation and the read-out time (scanning time) has to be kept fairly short. Indeed, as explained in said U.S. patent when the panel comprising an infra-red ray-stimulable phosphor is scanned with infra-red rays, and the fluorescent light emitted therefrom is processed electrically, a certain period of time is required to scan the overall face of the panel, and accordingly, there is the possibility that a difference arises between the initial output and the final output even though the initial portion and the final portion of the panel absorb the same amount of radiation beforehand.

Bearing in mind the above, attempts have been made to formulate phosphor compositions showing a stimulation spectrum in which the emission intensity in the visible wavelength range below 600 nm is still high.

In U.S. Pat. No. 4,948,696 a divalent europium activated complex halide phosphor is described represented by the formula:

$$BaFx.xNaX':aEu^{2+}$$

wherein X and X' each designate at least one of Cl, Br and I, x is a number satisfying $0<x\leq 10^{-1}$, and a is a number satisfying $0<a\leq 0.2$.

Said phosphor, actually by the definition of X, X' and "x" being likewise a phosphor having the halides other than fluorine stoichiometrically in excess of the fluorine, is claimed for use in radiography wherein the phosphor after its X-ray exposure is photostimulated with light in the wavelength range of 450 to 1,100 nm. According to the stimulation spectrum given of a particular phosphor in FIG. 1 in said lastmentioned U.S. patent the stimulation peak is above 600 nm and photostimulability drops considerably below 500 nm.

In European patent specification 0 021 342 (see also U.S. Pat. No. 4,512,911) a rare earth element activated complex halide phosphor is described of which the luminance of light emitted upon photostimulation is enhanced by incorporating in the phosphor at least one fluoride selected from the group consisting of specific alkali metal fluorides, specific divalent metal fluorides and specific trivalent metal fluorides in a proper amount as the constituent of the host material of the phosphor which is represented by the formula:

$$BaF_2.aBaX_2.bMgF_2.cMe^{I}F.dMe^{II}F_2.eMe^{III}F_3:fLn$$

wherein X is at least one halogen selected from the group consisting of chlorine, bromine and iodine, $Me^{I}$ is at least one alkali metal selected from the group consisting of lithium and sodium, $Me^{II}$ is at least one divalent metal selected from the group consisting of beryllium, calcium and strontium, $Me^{III}$ is at least one trivalent metal selected from the group consisting of aluminium, gallium, yttrium and lanthanum, Ln is at least one rare earth element selected from the group consisting of europium, cerium and terbium, and a, b, c, d, e and f are numbers satisfying the conditions of $0.90\leq a\leq 1.05$, $0\leq b\leq 1.2$, $0\leq c\leq 0.9$, $0\leq d\leq 1.2$, $0\leq e\leq 0.03$, $100^{-6}\leq f\leq 0.03$ and c+d+e are not equal to zero.

The phosphors according to said lastmentioned formula are claimed to emit light of higher luminance than the conventional rare earth element activated divalent metal fluorohalide phosphor when stimulated by light of wavelength ranging from 450 to 800 nm after exposure to ionizing radiation such as X-rays. A stimulation spectrum of said phosphors has not been given, the measurement of luminance by photostimulation was performed with light of 630 nm which was obtained by causing the light emitted by a xenon lamp in a spectroscope to pass through a diffraction grating.

In published European patent applications (EP-A) 0 345 903, 0 345 904 and 0 345 905 barium fluorohalide phosphors are mentioned that are not within the scope of the above mentioned empirical formula of said EP-A 0 021 342 and wherein the high yield of fluorescent light on photostimulation is the result of the presence of strontium together with fluorine stoichiometrically in larger atom % than bromine taken alone or bromine combined with chlorine and/or iodine. The presence of Sr together with a stoichiometric excess of fluoride with respect to the other halides at concentrations outside the preferred concentration ranges stipulated in claim 21 of said EP-A 0 021 342 surprisingly brings about a substantial increase in the X-ay conversion efficiency on photostimulation with He—Ne (633 nm) laser beam as illustrated e.g. in FIG. 6 of published EP-A 0 345 903 and FIG. 3 of published EP-A 0 345 904.

European patent specification 0 144 772 relates to a divalent europium activated complex halide phosphor having the following formula (I):

$$MFX.aCsX':xEu^{2+} \quad (I)$$

in which

M is at least one alkaline earth metal selected from the group consisting of Ba, Sr and Ca;

X is at least one halogen selected from the group consisting of Cl, Br and I;

X' is at least one halogen selected from the group consisting of F, Cl, Br and I; and a and x are numbers satisfying the conditions of $0<a\leq 1.5$ and $0<x\leq 0.2$, respectively.

The process for the preparation of the phosphor having said formula (I) comprises mixing:

(1) at least one alkaline earth metal fluoride selected from the group consisting of $BaF_2$, $SrF_2$ and $CaF_2$;

(2) at least one alkaline earth metal halide selected from the group consisting of $BaCl_2$, $SrCl_2$, $CaCl_2$, $BaBr_2$, $SrBr_2$, $CaBr_2$, $BaI_2$, $SrI_2$ and $CaI_2$;

(3) at least one cesium halide selected from the group consisting of CsF, CsCl, CsBr and CsI; and (4) at least one compound selected from the group consisting of europium compounds such as europium halide, europium oxide, europium nitrate and europium sulfate, as starting materials for the phosphor in a stoichiometric ratio corresponding to the above empirical formula; and optionally ammonium halide ($NH_4X''$, in which X'' is any one of Cl, Br and I) as a flux; and firing the obtained mixture at a temperature within the range of 500°–1,300° C. in a weak reducing atmosphere.

It has been said that from the viewpoint of the luminance of stimulated emission, it is preferable that M in said empirical formula is Ba, X represents Br, and X' represents at least one element selected from the group consisting of Br and I, and the number x indicating the amount of europium activator is within the range of $10^{-5}\leq x\leq 10^{-2}$.

From FIG. 4 in said lastmentioned European patent specification can be learned further that the relative luminance of stimulated emission of a $BaFBr.aCsI:Eu^{2+}$ phosphor is not markedly improved at "a" values below 0.1 relating to the Cs concentration in the phosphor.

Further it has been made clear that when in a phosphor within the scope of said formula (I) any fluorine (F) is stoichiometrically in excess over the other halogens Br, Cl and I such fluorine in excess will be stoichiometrically equivalent to the atom concentration of Cs since excess fluorine is introduced as CsF.

OBJECTS AND SUMMARY OF THE INVENTION

It is an object of the present invention to provide new phosphors having a particularly high conversion of stored X-ray energy into fluorescent light on photostimulation with light in a wavelength range between 480 nm and 550 nm, so that light of an argon ion laser corresponding with its main emission lines of 514 and 488 nm and frequency doubled light (532 nm) of a solid state Nd-YAG laser originally emitting at 1064 nm can be efficiently used in photostimulation.

It is another object of the present invention to provide an X-ray screen or panel containing said photostimulable phosphor dispersed in a binder layer.

It is a further object of the present invention to provide a method of recording and reproducing a pattern of penetrating radiation by means of a panel including said phosphor in dispersed form.

Other objects and advantages of the present invention will become clear from the following description.

In accordance with the present invention a photostimulable phosphor is provided which is within the scope of the following empirical formula (A):

$$Ba_{1-x-y-p-z}Sr_xM_y^{II}Cs_{2p}F_{2-a-b}Br_aX_b:zEu$$

wherein:

X is at least one halogen selected from the group consisting of Cl and I, $M^{II}$ is at least one alkaline earth metal selected from the group consisting of Ca and Mg;

x is in the range $0.10 \leq x \leq 0.55$;

a is in the range $0.70 \leq a \leq 0.96$;

preferably a is a number satisfying the conditions of $0.85 \leq a \leq 0.96$ when x is $0.17 \leq x \leq 0.55$ and $0.90 \leq a \leq 0.96$ when x is $0.12 \leq x \leq 0.17$;

y is in the range $0 \leq y \leq 0.10$;

b is in the range $0 \leq b < 0.15$;

p is in the range $10^{-4} \leq p \leq 10^{-1}$, and z is in the range $10^{-6} \leq z \leq 10^{-2}$.

DETAILED DESCRIPTION OF THE INVENTION

In preferred phosphors according to said empirical formula (A) the atomic concentration of fluorine is 1.08 to 1.22 larger than the atomic concentration of bromine taken alone or bromine combined with chlorine and/or iodine. So, when saying that the subscript "a" of Br in said empirical formula (A) is in the range of $0.90 \leq a \leq 0.96$ we express actually that the ratio of the atom concentration of fluorine to that of bromine in the phosphor is in the range of 1.08 to 1.22.

In preferred phosphors for use according to the present invention p is in the range $10^{-4} \leq p \leq 5 \times 10^{-2}$, corresponding to a cesium concentration that yields under the conditions of the defined excess of fluorine in combination with the presence of strontium in the phosphor a considerable increase in luminance of the stimulated emission of fluorescent light by stimulation with light within the wavelength range of 480 nm to 600 nm.

In preferred phosphors for use according to the present invention "z" is in the range $10^{-5} < z \leq 10^{-2}$.

Preferred photostimulable phosphors according to said empirical formula (A) are characterized by a photostimulation spectrum the maximum of which is at a wavelength shorter than 600 nm.

A photostimulable phosphor according to the present invention is prepared preferably by using as starting materials in the firing:

(1) barium fluoride;

(2) ammonium bromide as the reactant for providing bromide ions;

(3) optionally barium halide (except barium fluoride and barium bromide);

(4) a cesium compound, e.g. cesium fluoride, cesium bromide or cesium iodide, or mixtures thereof;

(5) a strontium halide, optionally in admixture with a calcium and/or magnesium halide;

(6) at least one Eu compound selected from the group consisting of europium halide, europium oxide, europium nitrate and europium sulphate, preferably $EuF_3$ that is reduced to yield $Eu^{2+}$ ions during firing.

The firing proceeds preferably in the temperature range of 700° to 1000° C. and in a reducing atmosphere.

According to a preferred example the preparation of a phosphor according to the present invention proceeds as follows:

a raw mix of 0.86 mol of $BaF_2$, 0.14 mol of $SrF_2$, 0.985 mol of $NH_4Br$ and 0.001 mol of $EuF_3$ was prepared. To that mix small amounts (in the range of 0.1 to 1 wt % to the total solids) of CsF, CsCl, CsBr and/or CsI were added. The thus obtained raw mix was then fired at a temperature between 700° and 1000° C. in a reducing atmosphere.

The firing lasted at least 2 h but may proceed up to 10 h.

The reducing atmosphere is a mixture of hydrogen with inert gas, e.g. argon or nitrogen or is formed in situ by reaction of charcoal and water vapour to form a mixture of hydrogen and carbon monoxide or hydrogen and carbon dioxide. In the reducing atmosphere most or all of the present trivalent europium is reduced to divalent europium.

After the firing is completed the product obtained is pulverized. The pulverized product may be further fired. Multiple firing may be advantageous to improve the homogeneity and stimulation properties of the phosphor.

In accordance with the present invention a radiation image recording and reproducing method is provided which method comprises the steps of:

(i) causing a visible radiation stimulable phosphor to absorb penetrating radiation having passed through an object or emitted by an object and to store energy of said penetrating radiation in said phosphor, which is within the scope of the above defined empirical formula (I), (ii) stimulating said phosphor with visible radiation in the wavelength range from 480 nm to 550 nm, preferably in the wavelength range of 480 to 540 nm, to release energy stored in said phosphor as fluorescent light differing in wavelength range from the stimulating light, and (iii) detecting said fluorescent light preferably after separation by filter means from the stimulating light.

Preferred light sources for producing stimulation light in the wavelength range of 480 nm to 550 nm are the frequency doubled (532 nm) Nd-YAG laser, and an argon ion laser wherefrom either the 488 nm line or 514.5 nm emission line is used.

Suitable filter means for use in said method can be: cut-off filters, transmission bandpass filters and band-reject filters. A survey of filter types and spectral transmittance classification is given in SPSE Handbook of Photographic Science and Engineering, Edited by Woodlief Thomas, Jr.—A Wiley-Interscience Publication—John Wiley & Sons, New York (1973). p. 264–326.

Shortwave pass filters that transmit the shorter wavelengths and reject the longer wavelengths are listed in Table 4.12 of said SPSE Handbook.

Bandpass filters that transmit or reject only a limited band of wavelengths are listed in Tables 4.13 and 4.14 respectively. Tables of many selected long-wave, shortwave pass, and bandpass filters, both liquid and solid for wavelengths from 150 to 3500 nm, are given by W. Summer, Photo Sensitors, Chapman & Hall. London, 1957, chap. 9.

For example, a narrow bandpass filter SCHOTT BG3 (trade name) is suited for application in the present recording and reproduction method.

For blocking the light of a narrow laser line holographic band-reject filters designed for Raman spectroscopy are used preferably. Such filters are described in the periodical Applied Spectroscopy, Volume 45, Number 5, 1991, p. 765–770. Such filters are commercially available from Physical Optics Corporation. 20600 Gramercy Place, Suite 103, Torrance, Calif. 90501 under the name Raman Holographic Edge (RHE) filters. Such filters for blocking selectively 488 nm, 514, and 532 nm laser light are commercially available in diameters of 1 or 2 inch identified by Part Numbers RHE 488, RHE 514 and RHE 532 respectively.

Figure 3:
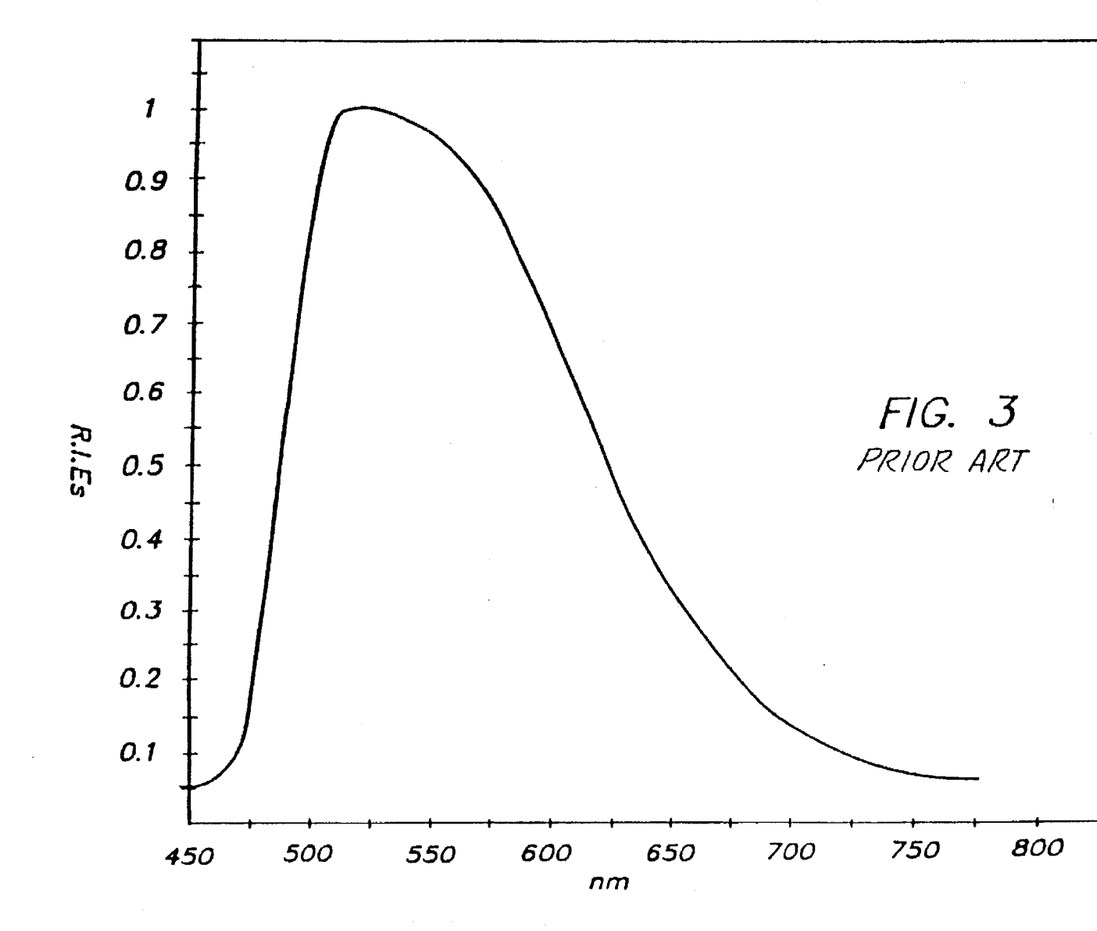
FIG. 3 relates to a said stimulation spectrum obtained with a non-invention phosphor that contains Sr as co-host metal and Na as codopant.

In the catalogue (July 1990) of the company OMEGA OPTICAL INC. 3 Grove Street, PO Box 573, Brattleboro Vt. 05301 U.S.A. interference filters and coatings are described. From said catalogue can be learned that there are several types of said band-reject filters on the market. In one type described in said catalogue under the name RAMAN NOTCH (RN) SERIES filters high-performance rejection band filters consist of four precisely aligned interference filters arranged in a chevron baffle (see page 14 of the main catalogue) and are sealed in a rectangular housing. In FIG. 3 of the catalogue optical density versus wavelength (nm) curve for the OMEGA RAMAN NOTCH filter tuned to the 514.5 argon-ion laser is given. It deeply attenuates the laser light to a minimum of $10^{-6}$, has a ripple-free transmission region on both sides of the rejection band, and peak transmission of 90%.

The other type of rejection band filters described in said catalogue under the name OMEGA REJECTION BAND (RB) series filters attenuate light of a spectral line or of a narrow spectral band and transmit wavelengths of light both longer and shorter than those in the band of rejection. RB series filters are useful where weak fluorescent electromagnetic radiation signals are obscured by the relatively very high intensity of the stimulating laser light.

In the method according to the present invention the photostimulable phosphor is used preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth) acrylates, e.g. poly(methyl methacrylate), a polyvinyl-n-butyral e.g. as described in the U.S. Pat. No. 3,043,710, a copoly(vinyl acetate/vinyl chloride) and a copoly (acrylonitrile/butadiene/styrene) or a copoly(vinyl chloride/ vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m2. The thickness of the phosphor layer is preferably in the range of 0.05 to 0.5 mm.

According to a preferred embodiment the phosphor layer is used as a support layer on a support sheet. Suitable support materials are made of a film forming organic resin, e.g. polyethylene terephthalate, but paper and cardboard supports optionally coated with a resin layer such as an alpha-olefinic resin layer are also particularly useful. Further glass and metal supports are used in certain circumstances, the latter preferably of high atomic weight, as described e.g. in U.S. Pat. Nos. 3,872,309 and 3,389,255, for use in industrial radiography (non-destructive testing).

According to a particular embodiment for industrial radiography the image-sharpness of the phosphor screen is improved by incorporating in the phosphor screen between the phosphor-containing layer and the support and/or at the rear side of the support a pigment-binder layer containing a non-fluorescent pigment being a metal compound, e.g. salt or oxide of lead, as described in Research Disclosure September 1979, item 18502.

For the preparation of the photostimulable phosphor screen the phosphor particles are intimately dispersed in a solution of the binder using an organic solvent, e.g. 2-methoxy-propanol or ethyl acetate, and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

Solvent-less coating may be carried out by using UV or electron beam (EB) curable binder compositions as described e.g. in Research Disclosure December 1977, item 16435.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

Optionally a light-absorbing layer is provided between the phosphor-containing layer and its support or in the support itself to avoid reflection and scattering of light at the interface of the support and the phosphor-containing layer, thereby increasing the image resolution of the photostimulable phosphor screen.

Since in the above described X-ray recording system operating with photostimulable radiographic screens the screens are used repeatedly, it is important to provide them with an adequate topcoat for protecting the phosphor-containing layer from mechanical and chemical damage. This is particularly important for photostimulable radiographic screens where each screen normally is not encased in a cassette.

A protective layer can be coated onto the phosphor containing layer by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bonded to the phosphor layer as described in published EP 00 392 474.

According to a further known technique a protective overcoat is produced with a radiation-curable composition. Use of a radiation curable coating as protective toplayer in a X-ray conversion screen is described e.g. in EP 209 358 and JP 86/176900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

According to a preferred embodiment the photostimulation of the phosphor-binder layer that has been image-wise or pattern-wise exposed with X-rays proceeds with a scanning laser beam. For use in combination with the phosphor screens according to the present invention preferably 514.5 nm or 488 nm light of an argon ion laser or the 532 nm light of a frequency doubled Nd-YAG laser is used as photostimulating light.

The light emitted by photostimulation (called stimulated light) is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

On the phosphors of the present invention measurements have been carried out to determine their photo-physical properties.

In one measurement the total photostimulable energy stored upon exposure to a given X-ray dose is determined. Prior to X-ray excitation any residual energy still present in the phosphor screen is removed by irradiation. To avoid photoexcitation during erasure a cut-off Schott GG435 filter, which eliminates all wavelengths below 435 nm, is placed between a lamp emitting photostimulating light and the phosphor screen. The phosphor screen is then excited with an X-ray source operating at 85 kVp and 20 mA. For that purpose the NANOPHOS X-ray source of Siemens AG - W.Germany may be used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The photostimulating light used in these measurements was argon ion laser light of 514.5 nm.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 382 computer connected to a HP 6944 A multiprogrammer. After amplification with a current to voltage converter a TDS 420 digital oscilloscope visualizes the photocurrent obtained. When the electronic shutter is opened the laser beam begins to stimulate the phosphor screen and the digital oscilloscope is triggered. Using a pinhole placed in contact with the screen an area of only 7 mm2 is exposed. Only half of the laser power reaches the screen surface. In this way the intensity of the stimulating beam is more uniform. A combination of a 5 mm thick SCHOTT GG455 and 5 mm thick BG39 filter was placed in front of the laser to remove both the weak ultraviolet and infrared components of the laser emission light.

The signal amplitude from the photomultiplier is linear with the intensity of the photostimulating light and with the released photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $$f(t) = A \cdot e^{-t/\tau}:$$

wherein A is the amplitude, $\tau$ is the time constant, t is the stimulation time, and e is the base number of natural logarithms.

63% of the stored energy has been released at $t=\tau$. To obtain said result, the computer multiplies the integral with the sensitivity of the measurement set up. The sensitivity of the photomultiplier and amplifier have therefore to be measured as a function of anode-cathode voltage of the photomultiplier and the convolution of the emission spectrum of the phosphor and the transmission spectrum of the separating filter has to be calculated.

Because the emission light is scattered in all directions only a fraction of the emitted light is detected by the photomultiplier. The positions of the panel and photomultiplier are such that 10% of the total emission is detected by the photomultiplier.

After all these corrections have been made a value for conversion efficiency ($C.E_1$.) is obtained expressed in $pJ/mm^2/mR$. To correct for the the total quantity of phosphor irradiated with X-rays, this value is divided by the screen thickness to yield a conversion efficiency (C.E.) expressed in $pJ/mm^3/mR$. This value varies with screen thickness and therefore for measurements to be comparable they have to be carried out at constant phosphor coverage.

In an other type of measurement the stimulation spectrum (R.I.Es versus nm as defined above) is determined. The light of a tungsten (quartz-iodine) lamp is fed into a monochromator (Bausch and Lomb - Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused by e.g. the dark current of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

The following examples illustrate the present invention without however limiting it thereto.

Example 1 relates to the preparation of a non-invention phosphor free from Cs.

A first series of examples (2–8) relates to phosphors with different Cs-content introduced through CsI.

A second series of examples (9–11) relates to phosphors with same Cs-content but in their firing different Cs-halide (CsBr, CsCl or CsF) have been used.

Example 12 relates to a Cs-containing invention phosphor wherein the Sr-content and F-content (in excess over the bromine content) is practically the same as of a Cs-free non-invention phosphor.

A third series of examples being non-invention examples (13 and 14) relates to phosphors with Li or Na as codopant instead of Cs.

Comparative Example 1

A Cs-free raw mix was prepared with the following composition:

$BaF_2$: 0.819 mole
$SrF_2$: 0.18 mole
$NH_4Br$: 1.00 mole
$EuF_3$: 0.001 mole.

One mole of this raw mix (ca. 260 g) was homogenized in a 500 ml PE-bottle (PE stands for polyethylene).

First, $BaF_2$, $SrF_2$ and $EuF_3$ were shaken in a TURBULA (tradename) mixer at 22 rpm for 30 min, in the presence of a single 40 mm agate ball. Next, the $NH_4Br$ was added and the mixture was shaken a second time on the TURBULA (tradename) mixer for 15 min at 22 rpm.

The mixture was then split up in two equal fractions, and each fraction was crushed in a 500 ml agate container, in the presence of eighteen 20 mm agate balls on a planetary ball mill for 15 min operating at 290 rpm.

After de-agglomeration with a pestle and mortar, the powder was subjected a last time to a mixing operation in a TURBULA (tradename) mixer for 30 min at 22 rpm.

These operations were repeated to yield about 500 g of raw mix. The thus obtained mix was fired in a tube in a box furnace. Therefor three 40 g samples of the mix in alumina crucibles were put in an alumina boat which was placed in said tube. The tube was inserted in the furnace already at a temperature of 850° C. and then sealed with a flange. The temperature was kept constantly at 850° C. for 2 hours while a $N_2$-flow containing 0.2% by volume of $H_2$ at a rate of 1 l/min was striking the samples.

After the firing, the furnace was allowed to cool down, the flange was removed, and the alumina boat containing the phosphor samples was taken out of the tube.

The powders of the three crucibles were combined and deagglomerated with mortar and pestle. The phosphor powder was then sieved over a 45µ mesh sieve. The phosphor particles passing the sieve were collected.

For the production of a storage phosphor screen the collected phosphor particles were dispersed in a binder solution containing cellulose acetobutyrate dissolved in methyl ethyl ketone. The dispersion obtained was coated onto a 100µ thick transparent sheet of polyethylene terephthalate to give a dry coating weight of about 1000 g/cm². The dried screen was used to determine the conversion efficiency (C.E. (pJ/mm³/mR) value as described hereinbefore. The synthesis and measurements were repeated three times to yield 4 phosphor samples, and four C.E. results.

The conversion efficiency C.E. of the four samples was set at 100 (C.E._r), and is considered to be the standard sensitivity of the Non-invention material, made in the absence of CsX.

The C.E._r values of the other phosphors of the Examples are relative values with respect to 100 being the reference value.

The elemental composition of the phosphor samples was determined based on their F- and Br-content and on the XRD-spectrum (X-ray diffraction spectrum) of the end-product. The average composition of the non-invention phosphor of comparative Example 1 is represented by the following formula:

$$Ba_{0.849}Sr_{0.15}Eu_{0.001}F_{1.09}Br_{0.91}$$

Invention Examples 2 to 7 and Non-Invention Example 8

The phosphors of the Invention-Examples 2 to 7 and of the Non-Invention Example 8 were prepared in the same way as the Comparative Example 1 phosphor, with the difference however that the $NH_4Br$ content of the raw mix has been somewhat lower (between 0.94 and 1 mole) and the in Table 1 indicated amounts of CsI, expressed in mole per mole Ba+Sr (mole/mole) for firing in the raw mix:

Invention example 2: 0.001 mole of CsI
Invention example 3: 0.003 mole of CsI
Invention example 4: 0.010 mole of CsI
Invention example 5: 0.030 mole of CsI
Invention example 6: 0.060 mole of CsI
Invention example 7: 0.090 mole of CsI
Non-invention example 8: 1.000 mole of CsI The F- and Br-contents of the phosphors were determined by elemental analysis. The content of unreacted $SrF_2$ was determined based on XRD measurements and the composition was calculated. All phosphor samples had compositions represented by the following formula:

$$Ba_{0.999-x-y/2}Sr_xCs_yEu_{0.001}F_{2-a}Br_a$$

The values of the subscripts x0 y and a for the different phosphor materials of the corresponding Examples are given hereinafter in Table 1.

The C.E. values were determined in the same way as for the Comparative Example 1 material. The relative C.E._r values of the invention phosphors 2 to 7 and of the non-invention phosphor 8 are given in Table 1. The C.E._r value of the non-invention Comparative Example 1 phosphor has been set arbitrarily at 100.

TABLE 1

| Sample | CsI | x | a | y | C.E.$_r$ |
|---|---|---|---|---|---|
| Invention phosphor 2 | 0.001 mole/mole | 0.16 | 0.90 | 0.001 | 171 |
| Invention phosphor 3 | 0.003 mole/mole | 0.17 | 0.90 | 0.003 | 251 |
| Invention phosphor 4 | 0.010 mole/mole | 0.17 | 0.90 | 0.01 | 210 |
| Invention phosphor 5 | 0.030 mole/mole | 0.16 | 0.93 | 0.03 | 188 |
| Invention phosphor 6 | 0.060 mole/mole | 0.16 | 0.96 | 0.06 | 241 |
| Invention phosphor 7 | 0.090 mole/mole | 0.13 | 0.91 | 0.09 | 181 |
| Non-invention phosphor 8 | 1.000 mole/mole | 0.06 | 0.64 | 0.71 | 72 |

Invention Examples 9 to 11

The phosphors of the Invention Examples 9 to 11 were prepared in the same way as the non-invention phosphor of Comparative Example 1, but with the differences that the amount of NH$_4$Br in the raw mix was 0.975 mole and that the following amounts of CsF, CsCl, CsBr or CsI expressed in mole per mole of Ba+Sr (mole/mole) in the raw mix were added prior to firing:

Invention example 9: 0.003 mole of CsBr

Invention example 10: 0.003 mole of CsCl

Invention example 11: 0.003 mole of CsF

The F- and Br-contents of the phosphors were determined by elemental analysis. The content of unreacted SrF$_2$ was determined based on XRD measurements and the composition was calculated. All phosphor samples had compositions represented by the following formula:

$$Ba_{0.9975-x}Sr_xCs_{0.003}Eu_{0.001}F_{2-a}Br_a$$

The values of the subscripts x and a for the different example materials are given in Table 2.

The C.E. values were determined in the same way as for the Comparative Example 1 phosphor. The relative C.E.$_r$ values of the invention phosphors 9 to 11 are given in Table 2. The C.E.$_r$ value of the non-invention Comparative Example 1 phosphor has been set arbitrarily at 100.

TABLE 2

| Sample | CsX | x | a | C.E.$_r$ |
|---|---|---|---|---|
| Invention phosphor 9 | 0.003 mole/mole of CsBr | 0.12 | 0.94 | 203 |
| Invention phosphor 10 | 0.003 mole/mole of CsCl | 0.14 | 0.96 | 218 |
| Invention phosphor 11 | 0.003 mole/mole of CsF | 0.15 | 0.96 | 270 |

Invention Example 12

The phosphor of Example 12 was prepared in the same way as the phosphor of non-invention Comparative Example 1, but with the difference that 0.001 mole of CsI, expressed in mole per mole Ba+Sr was present for firing.

The F- and Br-content of the phosphor was determined as described hereinbefore, the content of unreacted SrF$_2$ was determined based on XRD measurements as described hereinbefore and the composition was calculated. A phosphor sample composition was obtained represented by the following formula:

$$Ba_{0.9985-x}Sr_xCs_{0.001}Eu_{0.001}F_{2-a}Br_a.$$

The values of the subscripts x and a for the non-invention phosphor and invention phosphor are given in Table 3, as well as the amounts of unreacted SrF$_2$.

The C.E. values were determined in the same way as for the Comparative Example 1 phosphor. The C.E.$_r$ value of the non-invention Comparative Example 1 phosphor has been set arbitrarily at 100 (see Table 3).

TABLE 3

| Sample | CsI | x | a | [SrF$_2$] | C.E.$_r$ |
|---|---|---|---|---|---|
| Comparative phosphor 1 | none | 0.15 | 0.91 | 0.037 | 100 |
| Invention phosphor 12 | 0.001 mole/mole | 0.16 | 0.91 | 0.027 | 168 |

Table 3 shows that the Cs-containing phosphor according to the present invention has a higher C.E.$_r$ value than the Cs-free sample, and contains less unreacted SrF$_2$.

Non-Invention Examples 13 and 14

The phosphors of the non-invention Examples 13 and 14 were prepared in the same way as the Comparative Example 1 phosphor, with the difference however that the following amounts, expressed in mole per mole Ba+Sr (mole/mole) of LiF or NaF were present for firing:

Non-Invention example 13: 0.003 mole of LiF

Non-Invention example 14: 0.003 mole of NaF

The F- and Br-contents of the phosphors were determined by elemental analysis. The contents of unreacted SrF$_2$ were determined based on XRD measurements and the composition was calculated. The samples had compositions given by the following formula:

Non-invention Example 13: $Ba_{0.9975-x}Sr_xLi_{0.003}Eu_{0.001}F_{2-a}Br_a$

Non-invention Example 14: $Ba_{0.9975-x}Sr_xNa_{0.003}Eu_{0.001}F2-aBr_a$

The C.E. values were determined in the same way as for the Comparative Example 1 phosphor. The relative C.E.$_r$ values of the non-invention phosphors 1, 13 and 14 together with the C.E.$_r$ value of the invention phosphor 11 are given in Table 4. The C.E.$_r$ value of the non-invention Comparative Example 1 phosphor has been set arbitrarily at 100.

TABLE 4

| Sample | M$^I$X | x | a | C.E.$_r$ |
|---|---|---|---|---|
| Non-invention phosphor 1 | none | 0.15 | 0.91 | 100 |
| Non-invention phosphor 13 | 0.003 mole/mole of LiF | 0.18 | 0.92 | 99 |
| Non-invention phosphor 14 | 0.003 mole/mole of NaF | 0.18 | 0.93 | 166 |
| Invention phosphor 11 | 0.003 mole/mole of CsF | 0.17 | 0.90 | 270 |

Figure 1:
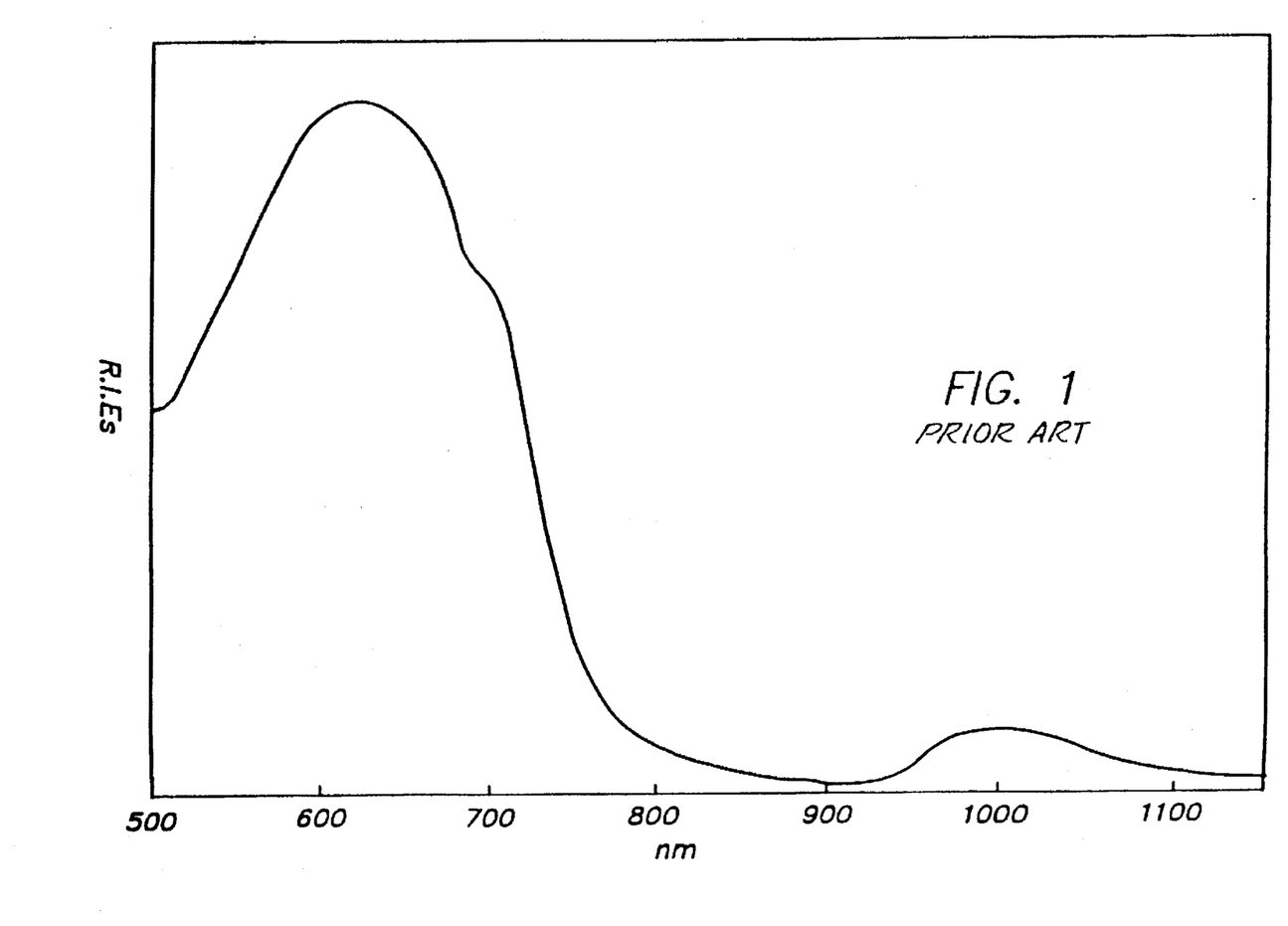
FIG. 1 relates to the stimulation spectrum representing relative emission intensity of the fluorescent light (R.I.Es) versus the wavelength (nm) of photostimulating light obtained with a prior art Cs- and strontium-free phosphor within the scope of the empirical formula of U.S. Pat. No. 4,239,968.
Figure 2:
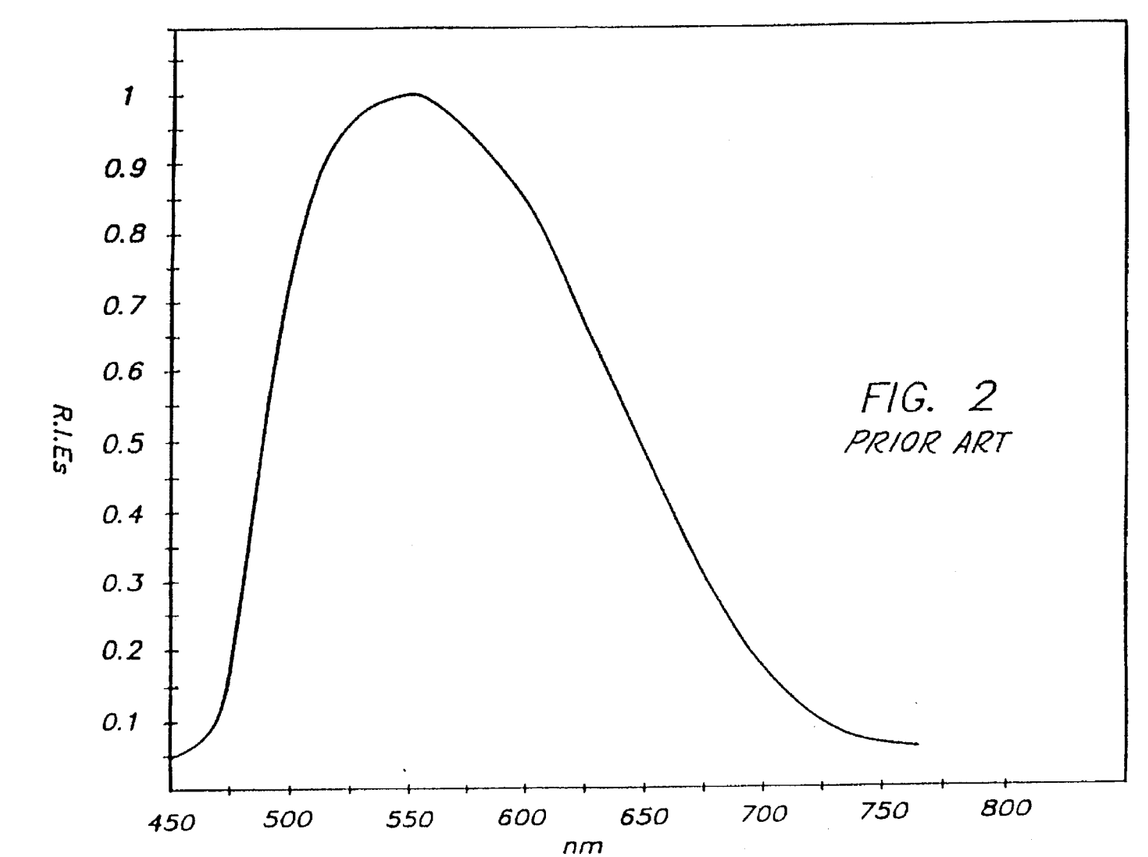
FIG. 2 relates to a said stimulation spectrum obtained with a non-invention phosphor that contains Sr as co-host metal and Li as codopant.

FIG. 2 relates to the stimulation spectrum obtained with the non-invention phosphor 13 that contains Sr as co-host metal and Li as codopant.

FIG. 3 relates to the stimulation spectrum obtained with the non-invention phosphor 14 that contains Sr as co-host metal and Na as codopant.

Figure 4:
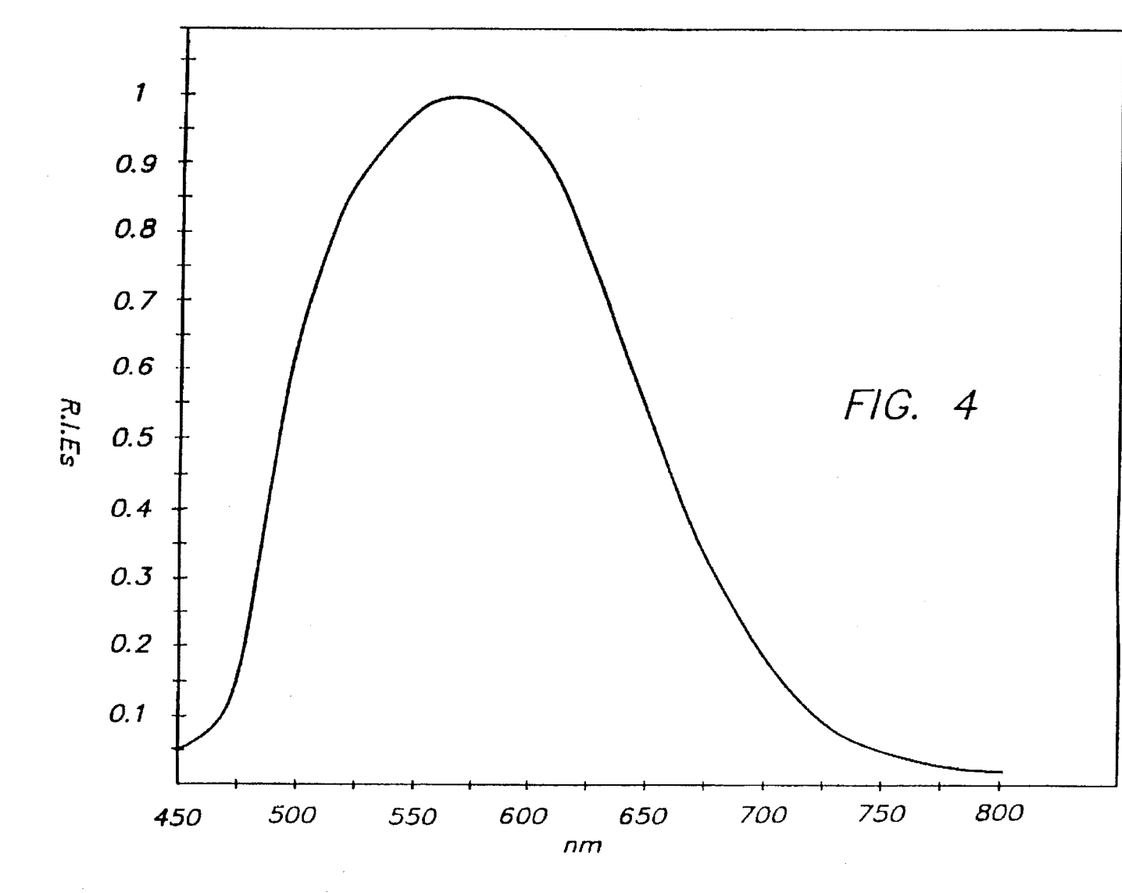
FIG. 4 relates to a said stimulation spectrum obtained with an invention phosphor that contains Sr as co-host metal and Cs as codopant.

FIG. 4 relates to the stimulation spectrum obtained with the invention phosphor 11 that contains Sr as co-host metal and Cs as codopant.

We claim:

1. A photostimulable phosphor, wherein said phosphor is within the scope of the following empirical formula (A):

$$Ba_{1-x-y-p-z}Sr_xM_y^{II}Cs_{2p}F_{2-a-b}Br_aX_b:zEu$$

wherein:

X is at least one halogen selected from the group consisting of Cl and I, $M^{II}$ is at least one alkaline earth metal selected from the group consisting of Ca and Mg;

x is in the range $0.10 \leq x \leq 0.55$;

a is in the range $0.70 \leq a \leq 0.96$;

y is in the range $0 \leq y \leq 0.10$;

b is in the range $0 \leq b < 0.15$;

p is in the range $10^{-4} \leq p \leq 10^{-1}$; and z is in the range $10^{-6} \leq z \leq 10^{-2}$.

2. A photostimulable phosphor according to claim 1, wherein $0.85 \leq a \leq 0.96$ and $0.17 \leq x \leq 0.55$.

3. Photostimulable phosphor according to claim 1, wherein the atomic concentration of fluorine is 1.08 to 1.22 larger than the atomic concentration of bromine taken alone or bromine combined with chlorine and/or iodine.

4. Photostimulable phosphor according to claim 1, wherein p is in the range of $10^{-4} \leq p \leq 5 \times 10^{-2}$.

5. Photostimulable phosphor according to claim 1, wherein z is in the range $10^{-5} < z \leq 10^{-2}$.

6. Photostimulable phosphor according to claim 1, wherein said phosphor is prepared by firing a mixture of the following starting materials:

(1) barium fluoride:

(2) ammonium bromide the reactant for providing bromide ions;

(3) optionally barium halide (except barium fluoride and barium bromide);

(4) a cesium compound selected from the group consisting of cesium fluoride, cesium bromide and cesium iodide including mixtures thereof;

(5) a strontium halide, optionally in admixture with a calcium and/or magnesium halide; and (6) at least one Eu compound selected from the group consisting of europium halide, europium oxide, europium nitrate and europium sulphate, such compounds being reduced to yield $Eu^{2+}$ ions during firing.

7. Photostimulable phosphor according to claim 6, wherein said phosphor is prepared by firing in a temperature range of 700° to 1000° C.

8. Photostimulable phosphor according to claim 1, wherein said phosphor is characterized by a photostimulation spectrum the maximum of which is at a wavelength shorter than 600 nm.

9. A photostimulable phosphor according to claim 1, wherein $0.90 \leq a \leq 0.96$ and $0.12 \leq x \leq 0.17$.

10. A radiation image recording and reproducing method comprising the steps of:

(i) causing a visible radiation stimulable phosphor to absorb penetrating radiation having passed through an object or emitted by an object and to store energy of said penetrating radiation in said phosphor, which is within the scope of the following empirical formula (A):

$$Ba_{1-x-y-p-z}Sr_xM_y^{II}Cs_{2p}F_{2-a-b}Br_aX_b:zEu$$

wherein:

X is at least one halogen selected from the group consisting of Cl and I, $M^{II}$ is at least one alkaline earth metal selected from the group consisting of Ca and Mg;

x is in the range $0.10 \leq x \leq 0.55$;

a is in the range $0.70 \leq a \leq 0.96$;

y is in the range $0 \leq y \leq 0.10$;

b is in the range $0 \leq b < 0.15$;

p is in the range $10^{-4} \leq p \leq 10^{-1}$; and z is in the range $10^{-6} \leq z \leq 10^{-2}$, (ii) stimulating said phosphor with visible radiation in the wavelength range from 480 nm to 550 nm to release energy stored in said phosphor as fluorescent light differing in wavelength range from the stimulating light, and (iii) detecting said fluorescent light.

11. Method according to claim 10, wherein in said empirical formula the subscript a is a number satisfying the conditions of $0.85 \leq a \leq 0.96$ when x is $0.17 \leq x \leq 0.55$.

12. Method according to claim 10, wherein in said phosphor the atomic concentration of fluorine is 1.08 to 1.22 larger than the atomic concentration of bromine taken alone or bromine combined with chlorine and/or iodine.

13. Method according to claim 10, wherein in said empirical formula p is in the range of $10^{-4} \leq p \leq 5 \times 10^{-2}$.

14. Method according to claim 10, wherein in said empirical formula z is in the range $10^{-5} < z \leq 10^{-2}$.

15. Method according to claim 10, wherein the stimulation proceeds with 532 nm light of a frequency doubled Nd-YAG laser.

16. Method according to claim 10, wherein the stimulation proceeds with 514.5 nm light of argon ion laser.

17. Method according to claim 10, wherein the stimulation proceeds with 488 nm light of argon ion laser.

18. Method according to claim 10, wherein in said empirical formula the subscript a is a number satisfying the conditions of $0.90 \leq a \leq 0.96$ and $0.12 \leq x \leq 0.17$.

* * * * *

UNITED STATES PATENT AND TRADEMARK OFFICE
CERTIFICATE OF CORRECTION

PATENT NO. : 5,629,125
DATED : May 13, 1997
INVENTOR(S) : Paul Leblans et al

It is certified that error appears in the above-indentified patent and that said Letters Patent is hereby corrected as shown below:

Column 3, line 61, "X-ay conversion" should read -- X-ray conversion --;

Column 5, line 57, "in the range $10^{-4} \leq p5 \times 10^{-2}$," should read -- in the range $10^{-4} \leq p \leq 5 \times 10^{-2}$, --;

Column 12, line 58, "subscripts x0 y and a" should read -- subscripts x, y and a --;

Column 14, line 42 (last part of "Non-invention Example 14:") "F2-aBr$_\alpha$" should read -- $F_{2-\alpha}Br_\alpha$ --;

Claim 18, column 16, line 56, "$0.90 \leq a \leq 0.96$ and $0.12 \leq x \leq 0.17$." should read -- $0.90 \leq a \leq 0.96$ when x is $0.12 \leq x \leq 0.17$. --.

Signed and Sealed this

Sixth Day of January, 1998

Attest:

BRUCE LEHMAN

*Attesting Officer*  *Commissioner of Patents and Trademarks*